June 5, 1962  R. BOTHE  3,037,692
READ-OUT MECHANISM FOR CALCULATORS
Filed July 22, 1959  3 Sheets-Sheet 1

June 5, 1962  R. BOTHE  3,037,692
READ-OUT MECHANISM FOR CALCULATORS
Filed July 22, 1959  3 Sheets-Sheet 2

United States Patent Office 3,037,692
Patented June 5, 1962

3,037,692
READ-OUT MECHANISM FOR CALCULATORS
Rudolf Bothe, Manchester, N.H., assignor to Bothe Computronics, Inc., Manchester, N.H., a corporation of New Hampshire
Filed July 22, 1959, Ser. No. 828,757
4 Claims. (Cl. 235—60.4)

This invention relates to electrical read-out mechanism for calculators of the type having a group of number wheels which occupy fixed positions in an axial direction and are rotatable to positions corresponding to numbers involved in or resulting from the calculation. These wheels will ordinarily occupy a great many different positions during the calculating operation and finally reach final positions which it is desired to read, and the electrical read-out mechanism of this invention is for the purpose of reading the positions of the group of number wheels.

In seeking to read out the data of such a calculator by electrical means, it would be possible to let each wheel carry one element of a rotary switch, for example a wiper arm, and have this rotary switch control circuits corresponding to the positions of the wheel. However, it is considered that such an arrangement, without further precautions, introduces the risk of undetected errors. A calculator number wheel rotates at high speed during the calculation and through many revolutions in the course of a day's work. Wear of the contacts against which a rotary wiper arm engages is inevitable in such high speed operation, and at some indeterminate time failure of such contacts is to be expected, whereupon undetected errors in reading out would occur.

Data which is read out from a calculator electrically may be translated into punched code, as on a tape, may be stored, and may be transmitted to a distant point. In any such case an error in reading out might go undetected until after considerable expense had been unnecessarily incurred.

It would be time consuming and expensive to periodically take a calculator apart to inspect such electrical contacts.

The contacts might conceivably be tested periodically to see whether they were operating properly at the time of test. Where the read-out data is automatically punched in code, the correctness of the reading out would need to be checked by someone familiar with the punching, and having access to this, possibly at some distance from the calculator.

It will be understood that where a punching machine is to be controlled by data which is electrically read out from a calculator, an ordinary five channel code may well be used, with one line employed for one character. The tape will then receive one line of punching and one step of advance for one pulse that is received from the calculator as each successive number wheel is read out. With an eleven wheel calculator a group of eleven lines of punching would be needed to test the reading out of the wheels in their No. 1 positions, another group of eleven lines of punchings would be needed to test the reading out of the wheels in their No. 2 positions, etc. Failure of a contact would be indicated by one of the groups of punchings containing only ten lines instead of eleven. This might be overlooked if testing were a routine procedure. Moreover, the fact that one group of punchings contained only ten lines instead of eleven would not of itself indicate at which number wheel the failure occurred.

It is accordingly a principal object of the invention to provide that electric read-out contacts on non-rotating elements and electric contacts carried by the several calculator number wheels shall be out of engagement while the calculator number wheels are rotating, only being brought into engagement when the wheels are stationary, as for reading out, and to accomplish this in a manner which is consistent with a satisfactory construction of the calculator as such. That is, the read-out mechanism is not to detract from the good operation of the calculator.

Another object in avoiding engagement of rotating and non-rotating contacts during calculating operation is to avoid applying a drag to the rotation of the number wheel and the train of connections that drive the number wheel. As well understood in the calculator art the operation of carrying over from one order of the machine to the next higher order is usually performed by a spring which is wound up by the carrying mechanism of the lower order and which acts through such means as a pawl to advance the accumulator of the next higher order. For avoidance of error it is customary that the accumulator be locked during the down stroke of its actuator. Again for avoidance of error it is customary that during operation of a given order of the machine, the actuation of the carrying pawl which carries over to that order is withheld until the prime actuation of the accumulator of that order has been completed. United States Patents Nos. 1,110,734 and 1,357,747 may be referred to for a discussion of these precautions. Thus in fast operation when adjacent orders are being operated simultaneously there will be instances when there is only a short time in which a carry can be performed, so that it may be said that the attainment of the combination of speed and accuracy depends upon ability of the machine to respond very quickly to a carry. Since the number wheel must turn during the quick carry-over, it is important that nothing shall retard the number wheel and hence retard the carry-over.

The indicating device disclosed in United States patent to Frischknecht No. 2,241,548 avoids an engagement of contacts carried by a number wheel on the one hand and stationary contacts on the other hand during rotation of the number wheel, but not by means suitable for incorporation in the usual calculator. In that patent the number wheel is shifted axially first to disconnect it from the means which determines its angular setting, and then to bring two contacts upon the wheel into engagement with stationary contacts outside the normal position of the number wheel. This is possible in the device of that patent because the number wheel is rotated without the use of any mechanical gearing to any other parts of the equipment, and a space in prolongation of one end of the number wheel is available for stationary switch segments and electrical connections from these switch segments, and the opposite end of the number wheel is available for the entrance of connections to an electromagnetic operating coil.

This construction is not suited for incorporation in the typical calculator for several reasons.

The typical calculator number wheel such as shown in an enlarged scale in U.S. Patent No. 2,279,337 comprises a hub or sleeve, a drum carrying the numbers, means, such as a flange or spokes, connecting one side of the drum to the hub, and an integral driving gear fast on the hub a little offset from the flange. This gear is continually in mesh with an intermediate gear so that the wheel is always in condition to be turned by this intermediate gear. The opposite end faces of the sleeve or hub abut against adjacent elements of the machine and are relied upon to hold the wheel against axial movement so as to keep its gear in mesh with the intermediate gear. Even a slight axial movement of the number wheel would disengage its gear from the intermediate gear, contrary to accepted calculator design.

Moreover, the presence of the intermediate gear, in mesh with the number wheel gear at one end of the number wheel, interferes with the use of this end of the wheel to carry wiper contacts similar to those of U.S. Patent No. 2,241,548 because such contacts must necessarily reach segment contacts which are distributed around a full 360° circumference, and the wiper contacts could not do this if an intermediate gear intercepted any part of this 360° path of the wiper contacts.

In a typical calculator the situation is further complicated by the presence within the projected area of the number wheel of portions of the carry cut-out lever, sometimes called a subtraction lever. Some of the parts associated with this carry cut-out lever can be eliminated, but if the carry cut-out lever itself were eliminated the machine would be unsuited for subtraction.

According to the present invention, the calculator number wheel is maintained in a fixed axial position, cooperating normally non-contacting switching elements are included within the interior of the number wheel, and one of these elements is shifted generally axially of the number wheel into engagement with the other element to establish the read-out circuit.

Considering that there is only about ¼ inch of axial length available within the number wheel, it will be seen that compactness of the switching mechanism is a problem to be solved. This can best be solved by simplification. Thus in preferred forms of the invention an electromagnetic means, such as a coil, for effecting the axial shift of a switching element carries the group of ten position-representing contacts on its end face.

In one form of the invention energization of this coil draws the coil and its ten position-representing contacts toward the other switching element carried by the number wheel. In another form of the invention energization of this coil draws the other switching element toward the coil and its ten-position representing contacts.

In both forms of the invention, leads from the switching elements extend out through the open end of the number wheel.

In each form of the invention the increase in rotational inertia of the number wheel is negligible, which is important from the standpoint of easy and reliable operation of the calculator, particularly in the carry-over operation.

A further object of the invention is to provide readout mechanism meeting the foregoing requirements, and which can be applied to commercial calculators with the minimum of change of existing parts of the machine and particularly without encumbering the number wheels.

Other objects and advantages of the invention will be apparent from this specification in which the invention is explained by reference to the drawings.

In the accompanying drawings.

Figure 2:
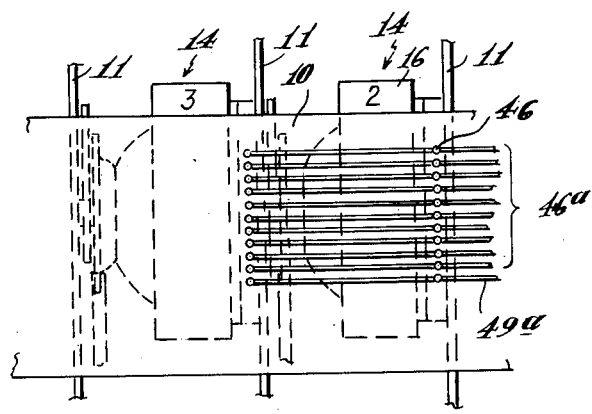
FIG. 2 is a front elevation, in front of the plane of the section of FIG. 1.

In FIG. 2 the interior frame of the calculator is shown as including a transverse front vertical plate 10 and spaced vertical plates 11 extending rearwardly therefrom and defining bays within which are located the number wheels for the various orders, namely units, tens, hundreds, etc. Typically there will be eleven such bays and number wheels.

Figure 1:
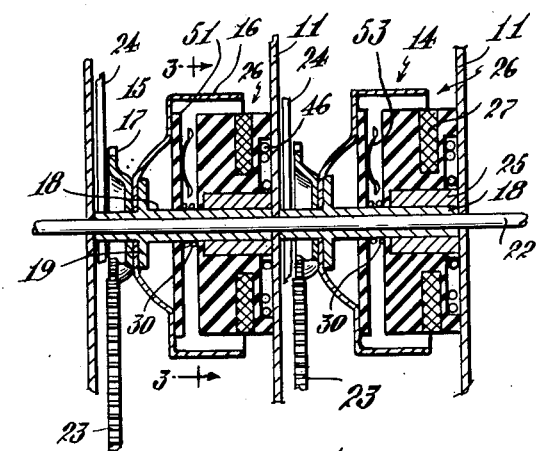
FIG. 1 is a vertical section on a considerably enlarged scale through two of the number wheels of a calculator showing the present invention applied thereto.

Number wheels which are conventional in shape and general construction are indicated at 14 and carry the digits zero through nine. As indicated in FIG. 1 wheel 14 consists essentially of a flange 15 carrying the cylindrical drum or dial 16, a driving gear 17, a rotatable hub or sleeve 18 extending between two of the plates 11 and provided with a flange 19. The flange 15, flange 19 and gear 17 are fastened together in any suitable manner for instance as shown in U.S. Patent No. 2,279,337, to constitute a rigid rotating element.

A stationary shaft 22 extending through the plates 11 provides an axis upon which all the number wheels turn. These number wheels are made with as little mass and inertia as possible in order to permit high speed operation.

Each number wheel gear 17 is constantly in mesh with an intermediate gear 23 which serves as its driver in rotating the gear forwardly in response to operation of a key in the corresponding order of the machine, in rotating the wheel forwardly in response to carry-over from the next lower order, and in rotating the wheel backwardly to zero in cancelling or zeroizing. The elements 10 through 22, as thus far described, are conventional. As typical in calculators the two end faces of the hub or sleeve are relied upon to hold the wheel in a fixed position axially, to keep its gear in mesh with the corresponding intermediate gear 23 and incidentially to keep the wheel from wandering into undesired contact with neighboring parts. As shown in FIG. 1, the end faces of the hub abut the frame plates 11.

Figure 5:
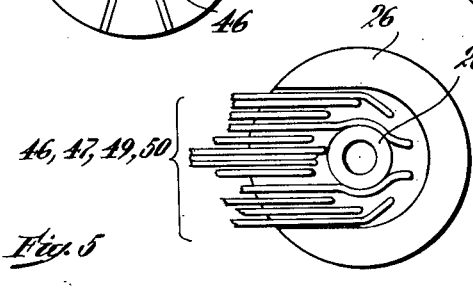
FIG. 5 is a face view of the right face of the slidable switching element of FIG. 3.
Figure 11:
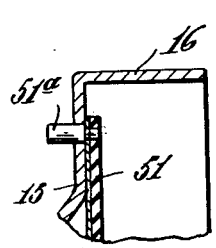
FIG. 11 is a fragmentary sectional view taken horizontally, that is, at right angles to the plane of FIG. 7.
Figure 6:
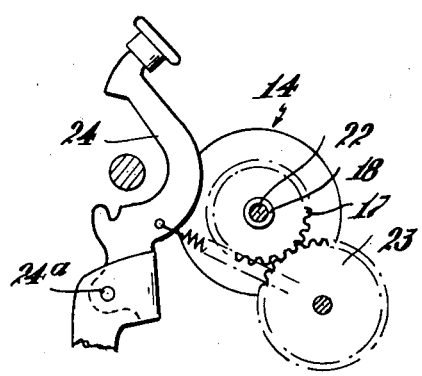
FIG. 6 is a diagram in the nature of a left elevation of a number wheel and some of the neighboring parts.

The carry cut-out lever or subtraction lever indicated by the reference character 71 in FIGS. 1 and 5 of United States Patent No. 2,278,183 has been retained as necessary for subtracting operation of the calculator and it is here indicated at 24, pivoted at 24a in FIG. 6. Part of this lever extends into the projected area of the number wheel at the left side of the wheel. However, to free the open end of the number wheel at the right side, the parts shown in FIGS. 6 and 7 of that patent have been omitted, and the carry cut-out lever is effective only so long as it is held depressed manually.

The switching means of FIG. 1 includes a stationary cylindrical armature 25 of soft iron loosely surrounding the sleeve 18.

Axially slidable on the armature 25 is a generally cylindrical coil spool 26 formed of insulating material. Intermediate its ends this member 26 is circumferentially grooved to receive a magnetic coil 27. The mid-plane of the coil 27 is located a little to the right of the mid-length of the armature 25. Thus, energization of the coil 27 urges the coil spool 26 to the left. A spring 30 restores coil spool to the right.

Figure 3:
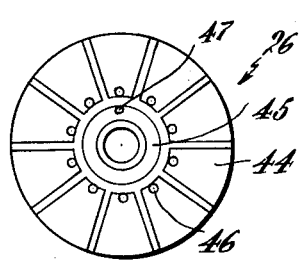
FIG. 3 is a face view of the left face of the slidable switching element, taken from the point of view indicated by the line 3—3 of FIG. 1.

Referring to FIG. 3 the left face of member 26 carries ten contact segments 44 corresponding to the digits 0, 1, 2 . . . 9, and a contact ring 45. These contacts may be given their shapes by photographic printing and etching. Insulated conductors 46 are connected to the contact segments 44 and an insulated conductor 47 is connected to the contact ring 45, their points of connection to the segments and ring being indicated in FIG. 3. These conductors extend back through the body of member 26, to the right in FIG. 1, and there turn forwardly toward the observer in FIG. 1 and emerge through a cut-away portion of member 26. Some of these conductors pass over and some pass under the stationary armature 25, and all the conductors then extend forwardly through the front plate 10. Conductors 46 join respective busses 46a which establish parallel connections to the corresponding contact segments of the several switching elements 26.

Conductors 47 extend individually to contacts of a distributor switch subsequently described.

The leads to the coil 27 similarly extend to the right, turn forward toward the observer in FIG. 1 and emerge from spool 26 along with the conductors 46 and 47. These leads to the coil are designated as 49 and 50. Leads 49 are connected to a negative bus 49a. Leads 50 extend individually to further contacts of the distributor switch subsequently described.

FIG. 5 shows the group of leads 46, 47, 49 and 50 emerging from the right face of the spool 26 and extending toward the front of the calculator.

Figure 4:
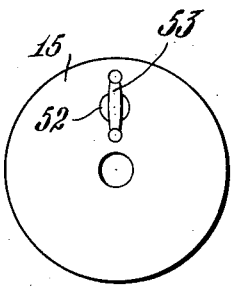
FIG. 4 is a face view looking toward the right face of the flange of the number wheel which lies opposite to the face of the slidable switching element of FIG. 3 and showing the switching element that cooperates therewith.

The inner face of flange 15 of the number wheel carries a sheet of insulating material 51, FIG. 4, on which is deposited a spot of copper 52, which in turn carries a resilient double ended wiper member 53 whose two ends form contacts adapted to engage with the segment contacts 44, and with the ring contact 45 respectively. The contacts of the wiper member 53 are normally out of engagement with these cooperating contacts, as indicated in FIG. 1, the coil spool 26 being normally held to the right by its spring 30, but the contacts of member 53 engage one of the segment contacts and the ring contact when the coil spool 26 is shifted to the left as its coil is pulsed in reading out.

As indicated in FIG. 2, the busses 46a which are connected to the several segment contacts may lead to a matrix which controls punching equipment. The arrangement of this matrix and its control of the punching equipment may be such as disclosed in my application Serial No. 828,758 for United States patent for Data-Transmitting and Punching Mechanism filed on the same date as the present application.

Figure 12:
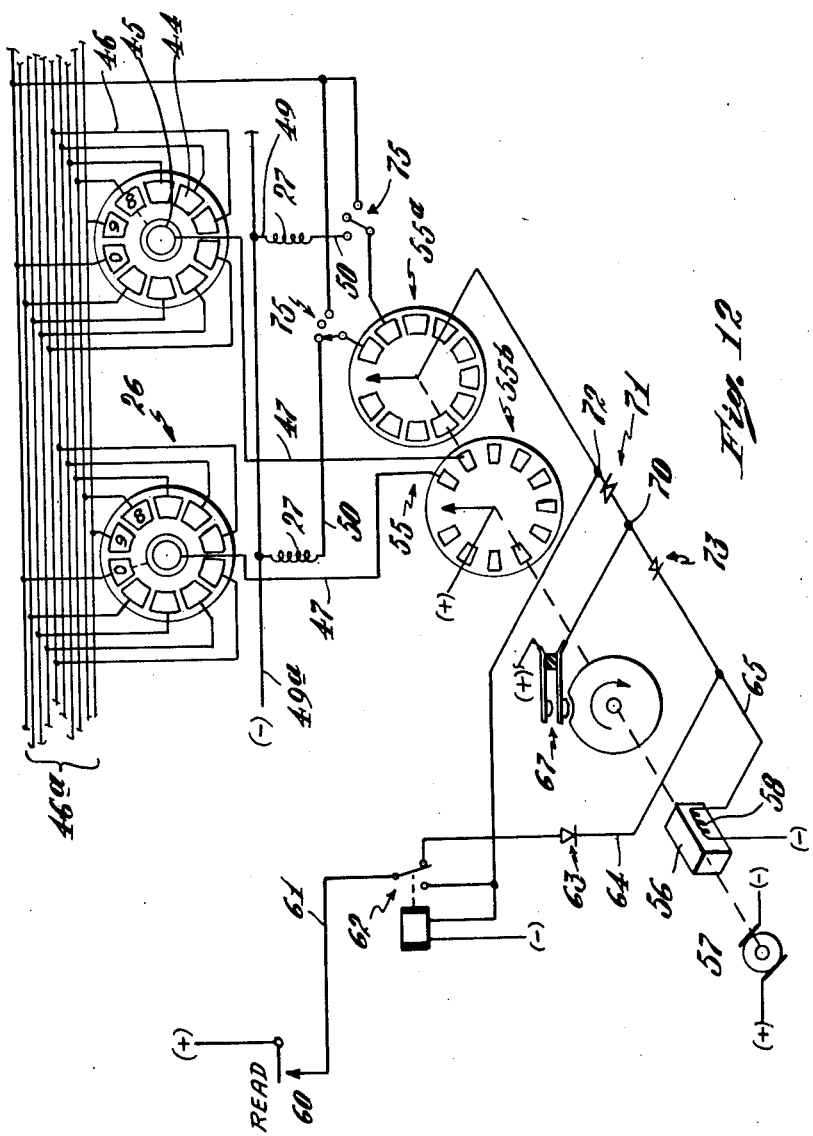
FIG. 12 is a schematic diagram showing means for applying pulses to the electromagnetic switching means of the several number wheels.

Connections from the eleven coils 27 extend to corresponding contacts of deck 55a of a two deck distributor switch 55 indicated in FIG. 12, only two of these eleven connections being shown. The distributor switch 55 is adapted during one revolution to apply pulses to the eleven read-out coils 27. For any given position of the particular number wheel being read out, the pulse will flow through the corresponding bs 46a to the corresponding entrance to the punch control matrix, become encoded in the matrix into the corresponding signal in the standard five channel code, and cause the punching equipment to punch, in this code, the value represented by the number wheel.

The conductors 47 from the central ring contacts extend to contacts of deck 55b of switch 55, only two of these conductors being shown in FIG. 12. Deck 55b serves to supply pulses to the several read-out units, for transmission to the punch controlling matrix.

For simplicity of illustration the switching elements 53 carried by the number wheels are not shown in detail, in FIG. 12 but dotted lines in this figure show how such element may bridge the control ring contact 45 and any one of the segments 44, for example the zero-position segment in the left unit shown and the eight-position segment in the right unit shown.

Each contact of deck 55b, though aligned on its center with a corresponding contact of deck 55a has only about one-half the angular extent of the corresponding contact of deck 55a. Thus the pulse to the central ring contact commences only after the read-out switch is closed by means of coil 27 and ends before the read-out switch is opened. There is accordingly no possibility of arcing within the number wheel.

The distributor switch 55 is shown as mechanically driven through a clutch 56 which in turn is driven by a motor 57. Clutch 56 is of the type which is normally disengaged, but becomes engaged by energization of a solenoid 58. This energization is initially caused by manually closing a "read" key switch 60 which establishes a circuit through conductor 61, and automatic switch 62 in its normal right-hand position, a blocking diode 63 and conductors 64 and 65.

The clutch is thereupon engaged and the distributor switch 55 begins to rotate.

A cam switch 67 which rotates with the distributor switch 55 is closed as soon as this rotation begins, establishing a circuit from (+) to junction 70 and thence through diode 73 and a conductor 65 to the clutch coil 58 and also through a diode 71 to junction 72.

From junction 72 one branch circuit extends to the wiper member of deck 55a of the distributor switch 55 to supply the pulses to the coils 27 and another branch circuit extends to the actuating coil of automatic switch 62, to render the "read" key switch ineffective to prolong energization of the clutch solenoid 58.

The above circuits from junctions 70 and 72 are maintained through one revolution of the cam switch and distributor switch, whereupon they are interrupted by opening of the cam switch. The clutch coil thereupon is de-energized and the distributor switch stops in its home position.

It will be seen that the circuit established by closure of the cam switch 67 insures that the distributor switch will make one full revolution although the "read" key switch is released before the read-out cycle is complete.

Moreover, if the "read" key switch is held closed throughout the full revolution of the distributor switch, the distributor switch will not make a second revolution until the "read" key switch is opened and again closed. The actuating coil of automatic switch 62 is energized and this switch is in its left position until the end of the revolution. In this position the clutch solenoid cannot be energized via the "read" key switch. If at the time the cam switch 67 opens at the end of the revolution the "read" key switch is still closed, then the circuit through conductor 61, the left contact of switch 62 and the operating coil of switch 62 will retain the switch 62 in its left position, preventing a further cycle of reading until the read key switch is opened and again closed.

Manual switches 75 are preferably interposed between the distributor switch 53 and the read-out coils 27. By opening a selected switch or switches 75 the reading out can be confined to any one or more number wheels. This is advantageous in condensing the punching when the calculator is dealing only with a few columns of significant figures and numerous of the number wheels consistently stand at zero. As indicated in the diagram each switch 75 has two alternate closed positions. One closed position enables the corresponding coil 27 to be energized in normal reading out. The other closed position diverts the pulse to the zero bus of the group of busses 46a. This latter arrangement permits omitting the reading out from any particular column of the calculator and automatically substituting a zero in the place of the unread numeral.

In the modified form of read-out mechanism of FIGS. 7–11, the numeral wheels, the calculator parts and the electrical wiring are all the same as in the mechanism of FIGS. 1–6 and its electrical diagram of FIG. 12. Corresponding reference characters are applied to corresponding parts in the two forms of mechanism and the description of the parts will not be repeated so far as they are the same in the mechanism of FIGS. 7–10.

In this mechanism of FIGS. 7–11 the element 25 has a pressed fit into the coil spool 26a and is loose upon the number wheel hub. The element 25 could if desired be omitted in this construction. However, it is preferred to retain this element to serve as a magnet core.

A disk 51 is slidably mounted on the hub 18 of the number wheel. The left face of this disk consists of 0.002 inch iron stock while the remainder of the thickness of the disk consists of fiber glass or other insulating material. Two pins 51a, fast upon the disk 51, extend loosely through corresponding holes in the disk, to key the disk to the number wheel.

Figure 9:
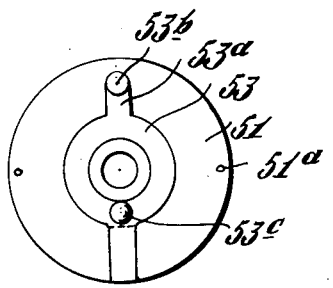
FIG. 9 is a face view of the switching element that cooperates with the switching element of FIG. 8, this switching element of FIG. 9 in this case being the slidable switching element.

Disk 51 carries on its right face a thin flat strip 53 of resilient conducting material, preferably berrylium copper. This strip is secured to disk 51 at its bottom and everywhere else is free from the disk. Its midportion, as shown in FIG. 9 is circular and open, to pass around the number wheel hub 18 without contact therewith.

The fastening of strip 53 to the disk 51 may be as follows. As indicated above the main part of the thickness of disk 51 is of insulating material. This may originally have been the so-called "printed circuit" material consisting of insulating material with a thin copper coating on what is the right face of the sheet in FIG. 7. All of this copper may be etched away except for an area which is to be overlain by the bottom end portion of strip 53, below the circular portion thereof. The strip 53 may then be soldered to this remaining copper.

As in the device of FIGS. 1–5 the coil spool is of insulating material and carries on its left face the segment contacts 44 and central ring contact 45.

Strip 53a carries two contact points 53b and 53c which are respectively in position to engage one of the segment contacts 44 and the central ring contact 45 when disk 51 is attracted by coil 27. With the coil deenergized, the spring 30 moves disk 51 back to the position of FIG. 7, with the contacts 53b and 53c disengaged from the segment contact and ring contact.

Figure 7:
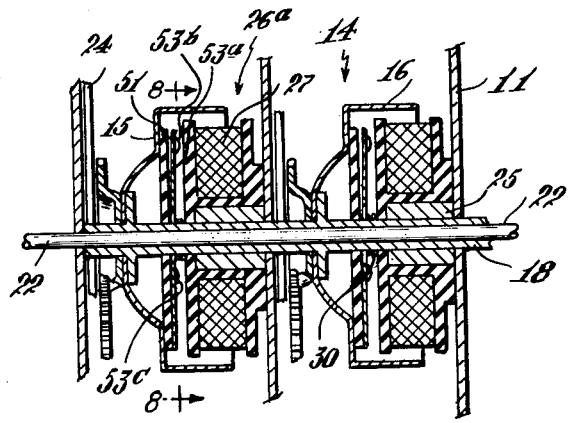
FIG. 7 is a view similar to FIG. 1 showing another specific form of the invention.
Figure 8:
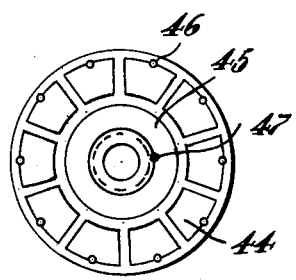
FIG. 8 is a face view of one of the switching elements of the device of FIG. 6 taken from the point of view indicated by the line 8—8 of FIG. 6.
Figure 10:
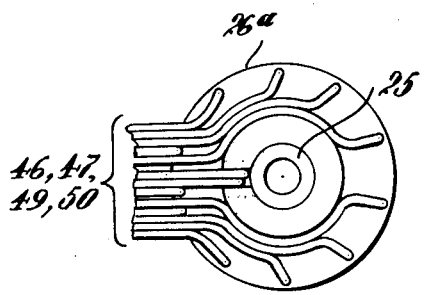
FIG. 10 is a left face view of the switching element of FIG. 8.

In the device of FIGS. 7 to 11 the spool instead of being cut away around the armature 25 and to the left thereof in FIG. 5, to provide a passage for the leads, is simply of reduced diameter at its right face as shown in FIGS. 7 and 10. The leads 46 from the contact segments in this case overlie the winding of coil 27.

I claim:

1. Read-out mechanism for calculators comprising calculator number wheels each of which includes a drum, a hub, and means connecting the hub and drum, the end faces of the hub acting to position the wheel in a fixed axial position, an electromagnetic coil having one of its end faces toward said connecting means, cooperating switching elements within the wheel, one of said switching elements comprising a plurality of non-rotating contacts representative of the possible angular positions of the number wheel, said contacts being mounted at the same side of the connecting means as said coil at that end face of the coil which faces toward said connecting means, the other switching element being at that side of the connecting means which faces the position-representative contacts and being rotatable with the number wheel, said switching elements being normally separated so that the rotatable switching element is out of engagement with all of the position-representing contacts, one of said switching elements being shiftable generally axially of the wheel by energization of said coil to make electrical contact between the rotatable switching element and the corresponding position-representing contact.

2. Read-out mechanism for calculators comprising calculator number wheels each of which includes a drum, a hub, and means connecting the hub and drum, the end faces of the hub acting to position the wheel in a fixed axial position, an electromagnetic coil having one of its end faces facing toward said connecting means, cooperating switching elements within the wheel, one of said switching elements comprising a plurality of non-rotating contacts representative of the possible angular positions of the number wheel and a common contact, said contacts being mounted at the same side of the connecting means as said coil at that end face of the coil which faces toward said connecting means, the other switching element being at that side of the connecting means which faces the position-representative contacts and being rotatable with the number wheel and arranged to bridge the several position-representative contacts and the common contact, said switching elements being normally separated so that the rotatable switching element is out of engagement with all of the position-representing contacts and the common contact, one of said switching elements being shiftable generally axially of the wheel by energization of said coil without shifting the wheel itself to make electrical contact between the rotatable switching element and the corresponding position-representing contact as a consequence of such shifting.

3. Read-out mechanism for calculators comprising calculator number wheels each of which includes a drum, a hub, and means connecting the hub and drum, the end faces of the hub acting to position the wheel in a fixed axial position, a coil spool having one of its end faces located within the wheel and facing toward said connecting means, said end face comprising insulating material, an electric winding on the coil spool, cooperating switching elements within the wheel, one of said switching elements comprising a plurality of non-rotating contacts representative of the possible angular positions of the number wheel, said contacts being carried by the said insulating material of the end face of the coil spool which faces toward said connecting means, the other switching element being at that side of the connecting means which faces the position-representative contacts and being rotatable with the number wheel, said switching elements being normally separated so that the rotatable switching element is out of engagement with all of the position-representing contacts, one of said switching elements being shiftable generally axially of the wheel by energization of said electric winding to make electrical contact between the rotatable switching element and the corresponding position-representing contact.

4. In read-out mechanism for calculators having rotary number wheels, the combination of rotary switching means in the several number wheels, each said switching means including cooperating switching elements normally ineffective to close a circuit, and electromagnetic means for shifting one of the elements generally axially of the number wheel to render the switching means effective to close a circuit, a rotary distributor switch having its distributor contacts connected to pulse the several electromagnetic means in succession in a cycle of operation of the distributor switch, means for driving said distributor switch, control means for the distributor switch including a switch under control of the human operator to close a circuit for instituting a cycle of operation of the distributor switch, holding means for holding the driving means in operation until one cycle of the distributor switch has been completed notwithstanding previous opening of the operator-controlled switch, and means for preventing further driving beyond a single cycle until the operator-controlled switch has been opened.

References Cited in the file of this patent
UNITED STATES PATENTS

| | | |
|---|---|---|
| 2,084,445 | Kottman | June 22, 1937 |
| 2,241,548 | Frischknecht | May 13, 1941 |
| 2,633,506 | Wittenmyer | Mar. 13, 1953 |
| 2,895,121 | Bliss | July 14, 1959 |
| 2,955,755 | Bradshaw | Oct. 11, 1960 |
| 2,955,758 | Jones | Oct. 11, 1960 |